United States Patent
Zhao et al.

(10) Patent No.: US 11,232,721 B2
(45) Date of Patent: Jan. 25, 2022

(54) METHOD FOR UPDATING CONTENT OF ELECTRONIC LABEL AND DEVICE

(71) Applicants: Beijing BOE Technology Development Co., Ltd., Beijing (CN); BOE Technology Group Co., Ltd., Beijing (CN)

(72) Inventors: Junjie Zhao, Beijing (CN); Zhiguo Zhang, Beijing (CN); Xin Li, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/851,374

(22) Filed: Apr. 17, 2020

(65) Prior Publication Data
US 2021/0097898 A1    Apr. 1, 2021

(30) Foreign Application Priority Data
Sep. 29, 2019 (CN) .......................... 201910937095.2

(51) Int. Cl.
G09F 3/20 (2006.01)
G09F 9/37 (2006.01)

(52) U.S. Cl.
CPC .............. G09F 3/208 (2013.01); G09F 3/204 (2013.01); G09F 9/372 (2013.01)

(58) Field of Classification Search
None
See application file for complete search history.

(56) References Cited

U.S. PATENT DOCUMENTS

2017/0024756 A1* 1/2017 Hulth ................. G06Q 30/0207
2018/0190160 A1* 7/2018 Bryan ................... A47F 5/0068

* cited by examiner

Primary Examiner — Adolf Dsouza
(74) Attorney, Agent, or Firm — Arent Fox LLP; Michael Fainberg

(57) ABSTRACT

A method for updating a content of an electronic label and a device are provided. The method includes: obtaining first object information of a first target object, where a distance difference between the first target object and a first coordinate position where a first electronic label is located is within a preset distance range; sending the first object information of the first target object to the first electronic label, and controlling the first electronic label to display the first object information of the first target object.

12 Claims, 7 Drawing Sheets

Obtaining first object information of a first target object, wherein a distance difference between the first target object and a first coordinate position where a first electronic label is located is within a preset distance range — S101

Sending the first object information of the first target object to the first electronic label, and controlling the first electronic label to display the first object information of the first target object — S102

METHOD FOR UPDATING CONTENT OF ELECTRONIC LABEL AND DEVICE

This application claims priority to Chinese Patent Application No. 201910937095.2, filed on Sep. 29, 2019, which is hereby incorporated by reference in its entirety.

FIELD

The present disclosure relates to the field of electronic labels, in particular to a method for updating a content of an electronic label and a device.

BACKGROUND

With the promotion of smart retailing, an electronic label, such as electronic shelf label (ESL), has become an important tool for commodity digitization, which completely gets rid of the heavy labor of manual price modification.

At present, there are two ways to modify the content of the electronic label. The first way is to issue the modification instruction through the server and modify the electronic label. For example, the display content of the electronic label at the corresponding location is controlled before the corresponding goods are arranged there. The second way is to make the hand-held terminal interact with the electronic label, and then the relevant content of the electronic label is modified.

SUMMARY

The present disclosure provides a method and a device for updating a content of an electronic label.

In a first aspect, the embodiment of the present disclosure provides a method for updating the content of an electronic label, including: obtaining first object information of a first target object, where a distance difference between the first target object and a first coordinate position where a first electronic label is located is within a preset distance range; and sending the first object information of the first target object to the first electronic label and controlling the first electronic label to display the first object information of the first target object.

Optionally, the method further includes: establishing a first corresponding relationship between the first electronic label and the first target object.

Optionally, after establishing the first corresponding relationship between the first electronic label and the first target object, the method further includes: according to the first corresponding relationship, detecting whether the first target object has changed; when the first target object has changed, determining second object information of a changed target object; and sending the second object information of the changed target object to the first electronic label, and controlling the first electronic label to display the second object information of the changed target object.

Optionally, establishing the first corresponding relationship between the first electronic label and the first target object includes: determining the first coordinate position of the first electronic label and a first electronic label identifier of the first electronic label, where the first electronic label identifier uniquely identifies the first electronic label; determining that there is the first target object whose distance difference from the first coordinate position is within the preset distance range; determining the first object information of the first target object; and establishing the first corresponding relationship between the first electronic label located at the first coordinate position and the first target object.

Optionally, determining the first coordinate position of the first electronic label includes: obtaining an image of the first electronic label, where the image includes a mark point configured to represent a coordinate position of the first electronic label; and determining the first coordinate position of the first electronic label according to the coordinate position represented by the mark point.

Optionally, detecting whether the first target object has changed according to the first corresponding relationship includes: determining third object information of a second target object, where a distance difference between the second target object and the first coordinate position is within the preset distance range; and detecting whether the third object information of the second target object is the same as the first object information of the first target object in the first corresponding relationship; wherein if the information is different, it indicates that the first target object has changed.

Optionally, after controlling the first electronic label to display the object information of the first target object, the method further includes: when the first electronic label moves from the first coordinate position to a second coordinate position, determining a third target object, wherein a distance difference between the third target object and the second coordinate position is within the preset distance range; determining fourth object information of the third target object; according to a second corresponding relationship between an electronic label located at the second coordinate position and a target object, detecting whether the third target object is different from a fourth target object previously located at the second coordinate position; when the third target object is different from the fourth target object previously located at the second coordinate position, sending the fourth object information of the third target object to the first electronic label, and controlling the first electronic label to display the fourth object information of the third target object.

Optionally, the first object information includes at least one of an identifier, price, or name.

In a second aspect, the embodiment of the present disclosure provides a method for updating a content of an electronic label, applied to a first electronic label, the method includes: receiving a status query request from an electronic label content updating device; in response to the status query request, sending status information of the first electronic label to the electronic label content updating device; receiving first object information of the first target object determined according to the status information of the first electronic label sent by the electronic label content updating device, where a distance difference between the first target object and a first coordinate position where a first electronic label is located is within a preset distance range; and displaying the first object information of the first target object.

Optionally, in response to the status query request, sending the status information of the first electronic label to the electronic label content updating device includes: in response to the status query request, sending an electronic label identifier of the first electronic label to the electronic label content updating device, where the electronic label identifier uniquely identifies the first electronic label; and controlling a status light in the first electronic label to flash.

In a third aspect, the embodiment of the present disclosure provides a device for updating the content of an electronic label, including: an acquisition unit, configured to obtain first object information of a first target object, where a distance difference between the first target object and a first coordinate position where a first electronic label is located is within a preset distance range; and a sending unit, configured to send the first object information of the first target object to the first electronic label and control the first electronic label to display the object information of the first target object.

In a fourth aspect, the embodiment of the present disclosure further provides a first electronic label, including: a first receiving unit, configured to receive a status query request from an electronic label content updating device; a response unit, configured to respond to the status query request and send status information of the first electronic label to the electronic label content updating device; a second receiving unit, configured to receive first object information of the first target object determined according to the status information of the first electronic label sent by the electronic label content updating device, where a distance difference between the first target object and a first coordinate position where a first electronic label is located is within a preset distance range; and a display unit, configured to display the first object information of the first target object.

In a fifth aspect, the embodiment of the present disclosure provides an electronic label content updating device including a memory and at least one processor, where the at least one processor is configured to read and execute instructions stored in the memory to perform the method of the first aspect.

In a sixth aspect, the embodiment of the present disclosure provides an electronic label including a memory and at least one processor, where the at least one processor is configured to read and execute instructions stored in the memory to perform the method of the second aspect.

DETAILED DESCRIPTION OF THE EMBODIMENTS

The terms "first" and "second" used in specification, claims and drawings of the present disclosure are used to distinguish different objects rather than to describe a particular order. In addition, the term "include" or "comprise" and any variations thereof are intended to cover a non-exclusive inclusion. For example, a process, method, system, product, or device that contains a series of steps or units is not limited to the listed steps or units, but optionally includes steps or units that are not listed, or optionally includes other steps or units that are inherent to these processes, methods, products, or devices.

The reference to "embodiment" in the present disclosure means that the particular features, structures or characteristics described in combination with the embodiment may be included in at least one embodiment of the present disclosure. The appearances of this phrase in various places in the specification are not necessarily all referring to the same embodiment, nor are separate or alternative embodiments mutually exclusive with other embodiments. It is understood explicitly and implicitly by those skilled in the art that the embodiments described herein may be combined with other embodiments.

In order to better understand the above technical solution, the solution of the present disclosure is explained in detail through the following drawings and embodiments. It should be understood that the embodiments and the features of the embodiments of the present disclosure are a detailed description of the solution of the present disclosure rather than the limitation to the solution of the present disclosure. In the case of making no conflict, the embodiments and the features of the embodiments of the present disclosure can be combined with each other.

Figure 1:
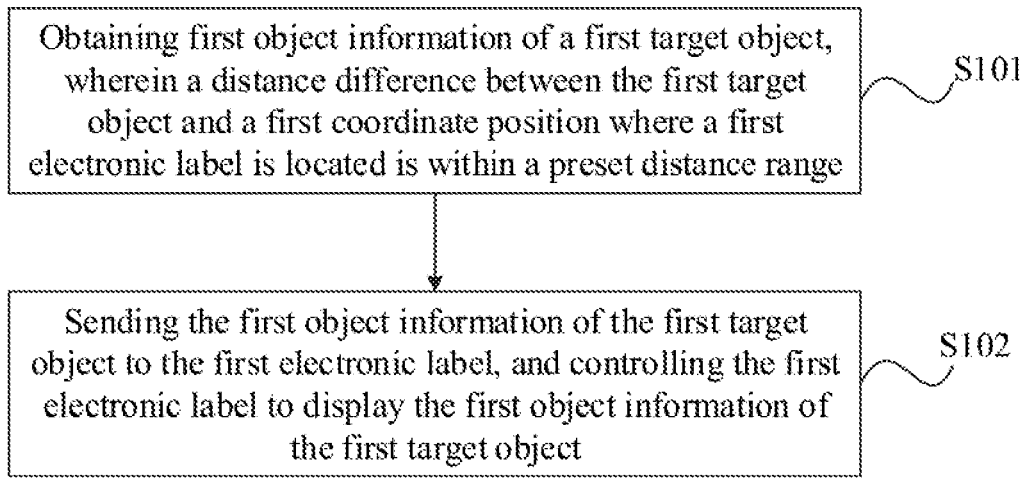
FIG. 1 is a method flow chart of a method for updating a content of an electronic label provided by an embodiment of the present disclosure.

Referring to FIG. 1, the embodiment of the present disclosure provides a method for updating a content of an electronic label, applied to an electronic label content updating device, including the steps S101 and S102.

S101: obtaining first object information of a first target object, where a distance difference between the first target object and a first coordinate position where a first electronic label is located is within a preset distance range.

In specific implementation, an electronic label content updating device may be a server, or a camera, etc. The first electronic label may be any electronic label registered in the server. The preset distance range is set by those skilled in the art according to the actual use of the user, for example, the preset distance range is (0 cm, 2 cm), or (0 cm, 3 cm).

In the embodiment of the present disclosure, before the content of the first electronic label is updated by the electronic label content updating device, a communication connection between related devices such as the camera, the first electronic label, and the label access point in charge of making the first electronic label access the server and the server shall be established in advance. For example, these devices are all registered in the server.

In specific implementation, the first target object may be an animal, a plant, a daily necessity, food and so on. The corresponding object information includes at least one of an identifier, price, or name. In some embodiments, the object information may be weight, or place of origin, etc. The identifier uniquely identifies the corresponding target object, such as the first target object.

S102: sending the first object information of the first target object to the first electronic label and controlling the first electronic label to display the first object information of the first target object.

In specific implementation, the electronic label content updating device sends the first object information of the first target object to the first electronic label. The first electronic label displays the first object information.

For example, the server D obtains object information of a target object d, i.e. "place of origin: E country, member price: F, product serial number: 140098059", and then an electronic label d displays "place of origin: E country, member price: F, product serial number: 140098059". A distance difference between the target object d and the electronic label d is within a preset distance range.

In the embodiment of the present disclosure, the electronic label content updating device directly controls, according to the obtained first object information of the first target object at a distance of a preset distance range of the first coordinate position of the first electronic label, the first electronic label to display the first object information so as to realize the rapid modification of the content of the first electronic label. In other words, based on the same processing principle, the content of any electronic label can be modified quickly according to the method for updating a content of an electronic label in the embodiments of the present disclosure.

In the embodiment of the present disclosure, the following step may be performed before the implementation of step S101: the first corresponding relationship between the first electronic label and the first target object is established. The first corresponding relationship includes the relationship among a position of an electronic label, a position of a first target object, a electronic label identifier and object information. The electronic label identifier uniquely identifies a corresponding electronic label. In specific implementation, after the first corresponding relationship is established, the first corresponding relationship can further be stored so as to detect whether the first target object has changed according to the first corresponding relationship.

Figure 2:
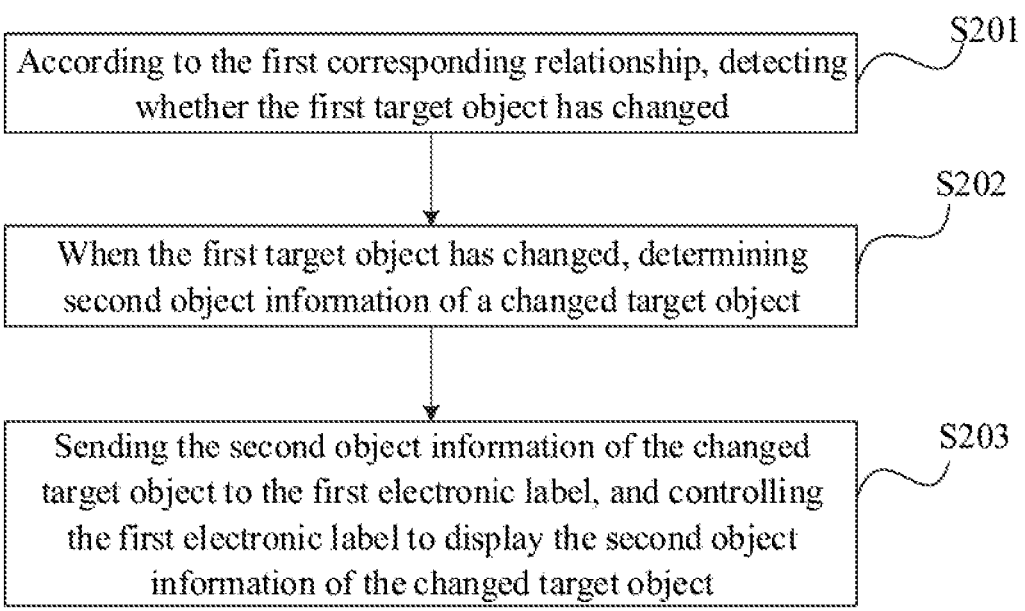
FIG. 2 is a method flow chart after establishment of a first corresponding relationship in a method for updating a content of an electronic label provided by an embodiment of the present disclosure.

In the embodiment of the present disclosure, as shown in FIG. 2, after establishing the first corresponding relationship between the first electronic label and the first target object, the method further includes S201 to S203.

S201: according to the first corresponding relationship, whether the first target object has changed is detected.

S202: when the first target object has changed, second object information of a changed target object is determined.

S203: the second object information of the changed target object is sent to the first electronic label, and the first electronic label is controlled to display the second object information of the changed target object.

In specific implementation, the realization process of the steps S201 to S203 is as follows.

Firstly, according to the first corresponding relationship between the first electronic label and the first target object, whether the first target object has changed is detected. Once the first target object has changed, the second object information of the changed target object is re-determined. Then, the second object information of the changed target object is sent to the first electronic label so as to control the first electronic label to display the second object information of the changed target object, thereby realizing the automatic update of the first electronic label, and the whole electronic label modification process is more flexible.

In an embodiment of the present disclosure, the following step may be implemented after the implementation of the step S101: the first corresponding relationship between the first electronic label and the first target object is established.

In other words, after obtaining the first object information of the first target object, the first corresponding relationship between the first electronic label and the first target object is established. That is to say, once the electronic label content updating device obtains the object information of any target object at a distance of a preset distance range of the coordinate position of any electronic label, the corresponding relationship between this electronic label and the target object may be established, thereby realizing quickly establishment of the corresponding relationship between the electronic label and the target object.

Figure 3:
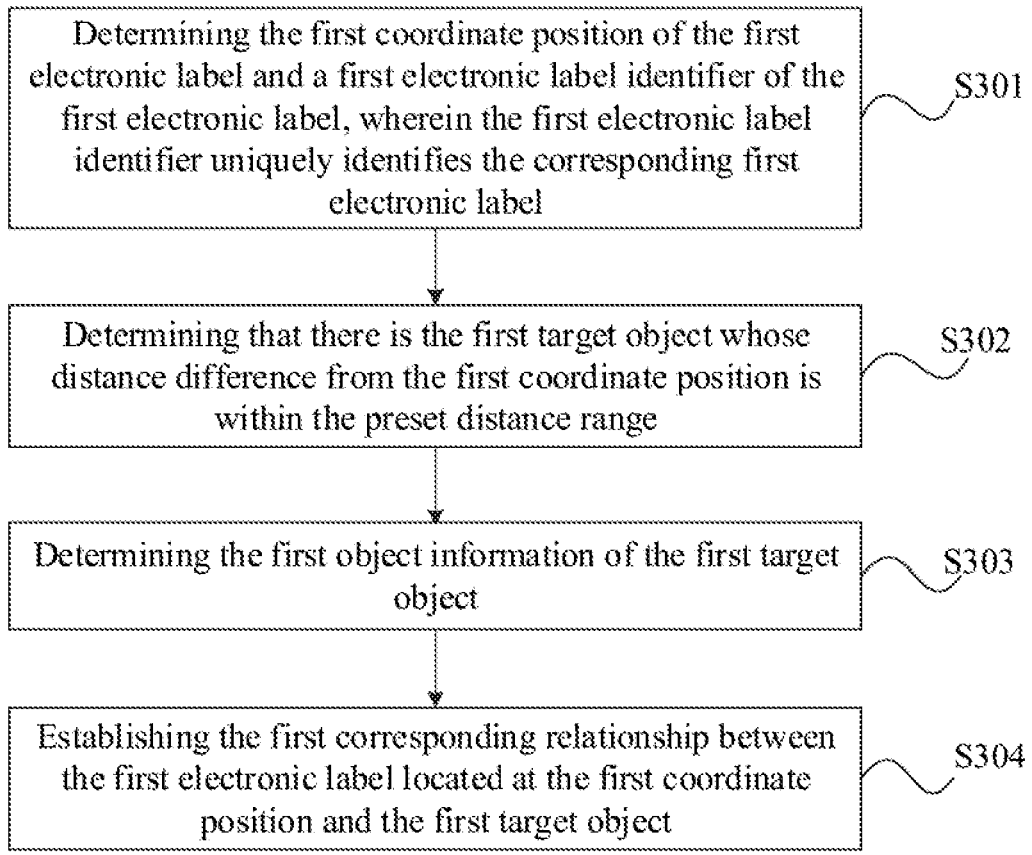
FIG. 3 is a method flow chart for a realization process of the first corresponding relationship established in a method for updating a content of an electronic label provided by an embodiment of the present disclosure.

In the embodiment of the present disclosure, as shown in FIG. 3, the specific realization process of the step, the first corresponding relationship between the first electronic label and the first target object is established, includes S301 to S304.

S301: the first coordinate position of the first electronic label and a first electronic label identifier of the first electronic label are determined, where the first electronic label identifier uniquely identifies the first electronic label.

S302: determining that there is the first target object whose distance difference from the first coordinate position is within the preset distance range.

S303: the first object information of the first target object is determined.

S304: the first corresponding relationship between the first electronic label located at the first coordinate position and the first target object is established.

In specific implementation, for example, when the device for updating the content of an electronic label is a camera, the realization process of the steps S301 to S304 is as follows.

Firstly, the first coordinate position of the first electronic label and the first electronic label identifier of the first electronic label are determined through the camera. The first electronic label identifier uniquely identifies the corresponding electronic label.

Specifically, the image of the first electronic label is collected and obtained through the camera. The image includes a mark point configured to represent a coordinate position of the first electronic label. For example, a red light-emitting diode is set at the fixed position of the first electronic label. The mark point in the image is the red luminous point when the red light-emitting diode flickers. Then, the coordinate position of the mark point can be determined by using image recognition technology, and then the first coordinate position of the first electronic label can be determined.

In specific implementation, the coordinate position of the mark point can be configured to represent the first coordinate position of the first electronic label. In addition, the first coordinate position can be a three-dimensional coordinate position or a two-dimensional coordinate position.

Here is a specific example to illustrate how the camera determines the first coordinate position of the first electronic label.

In the initial situation, if there are no goods on the shelf, a first coordinate position of the first electronic label can be determined first. For example, the server sends a status query request through a label access point or directly to the electronic label covered by the camera. For example, the server sends the status query request to the electronic label A1 at time t1. When the electronic label A1 receives the status query request, it flickers the corresponding red light-emitting diode if the status is normal, and then, the camera determines the coordinate position of the corresponding electronic label A1 according to the red mark point when the red light-emitting diode flickers. For example, the three-dimensional coordinate position of the electronic label A1 in the shelf is (5, 5, 5). Based on the same implementation principle, the camera finally determines the three-dimensional coordinate positions of all the electronic labels it can cover.

In addition, the server may send the electronic label identifier corresponding to the first electronic label to the camera.

Then, if the camera detects the existence of the first target object at a distance of a preset distance range of the first coordinate position, the first object information of the first target object is determined, and then the first corresponding relationship between the first electronic label at the first coordinate position and the first target object is established, thereby realizing the determination of the coordinate position of the electronic label first and then the establishment the corresponding relationship between the target object and the electronic label.

For example, Table 1 shows the corresponding relationship among each of a target object A, a target object B, and a target object C, and the corresponding electronic label and a position of the electronic label.

TABLE 1

| Target Object | A | B | C |
|---|---|---|---|
| Electronic label | a | b | c |
| Position | L1 | L2 | L3 |

Figure 4:
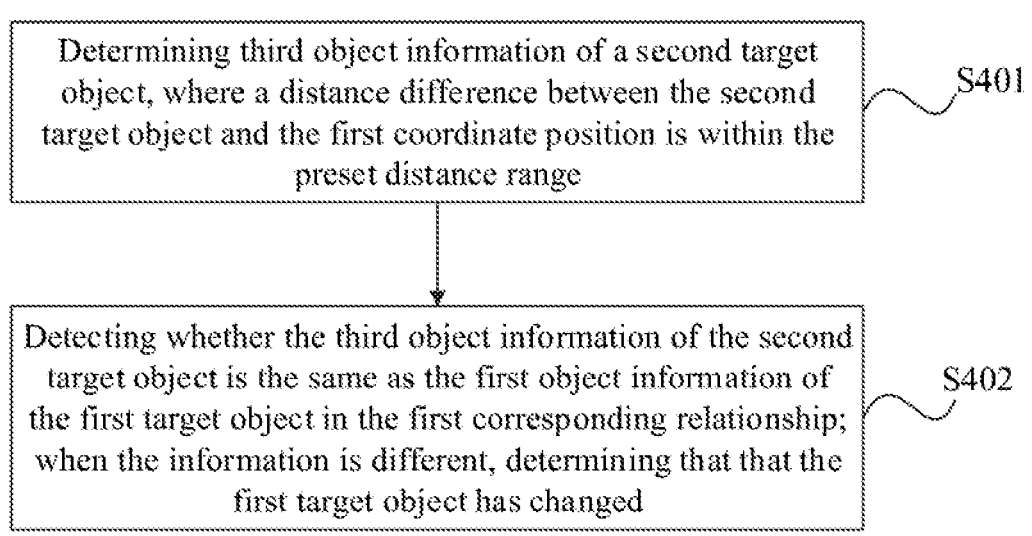
FIG. 4 is the method flow chart of step S201 in a method for updating a content of an electronic label provided by an embodiment of the present disclosure.

In the embodiment of the present disclosure, as shown in FIG. 4, the specific realization process of the step S201, whether the first target object has changed is detected according to the first corresponding relationship, includes S401 to S402.

S401: third object information of a second target object is determined. A distance difference between the second target object and the first coordinate position is within the preset distance range.

S402: whether the third object information of the second target object is the same as the first object information of the first target object in the first corresponding relationship is detected; when the information is different, it indicates that the first target object has changed.

For example, when the electronic label content updating device is a camera, the realization process of the steps S401 to S402 is as follows.

The camera collects an image of the second target object in real time, where a distance difference between the second target object and the first coordinate position where the first electronic label is located is within the preset distance range. The camera determines third object information of the second target object, or the camera receives third information of the second target object sent back by the server. The camera detects the second target object according to the first corresponding relationship. If the third object information of the second target object is different from the first object information of the first target object corresponding to the first electronic label in the first corresponding relationship, it indicates that the first target object has changed.

For example, the camera detects at time t2 that the target object corresponding to the electronic label a at position L1 is A, but at time t3 the target object corresponding to the electronic label a at position L1 is B. B is different from A, thus indicating that the commodity corresponding to the electronic label a at position L1 has changed from A to B. Thus, the content displayed by the electronic label can be updated timely according to the movement of the target object.

Figure 5:
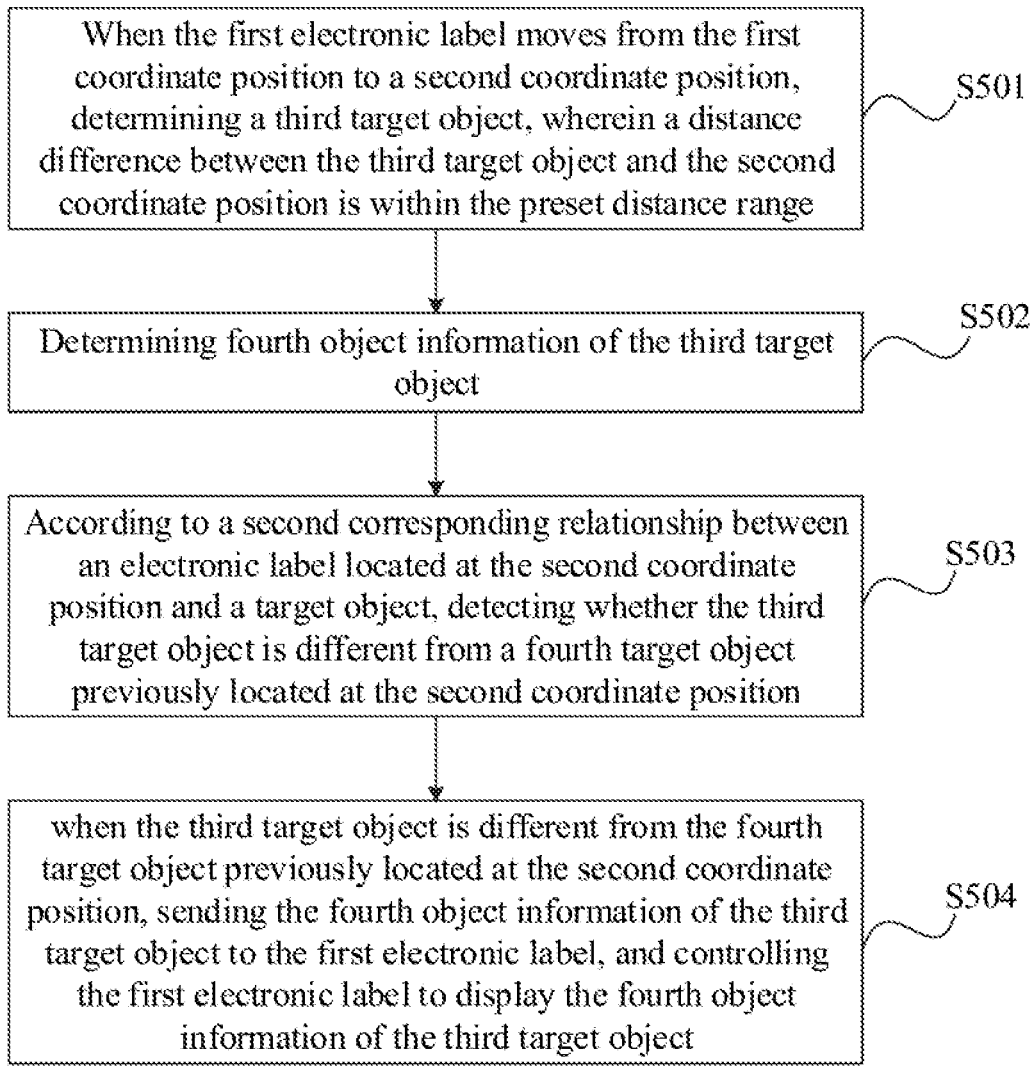
FIG. 5 is the method flow chart after step S102 in a method for updating a content of an electronic label provided by an embodiment of the present disclosure.

As shown in FIG. 5, after the step S102: the first object information of the first target object is sent to the first electronic label, and the first electronic label is controlled to display the first object information of the first target object, the method further includes S501 to S504.

S501: when the first electronic label moves from the first coordinate position to a second coordinate position, determining a third target object, where a distance difference between the third target object and the second coordinate position is within the preset distance range.

In specific implementation, the camera or the electronic label itself may detect the movement of the first electronic label from the first coordinate position to the second coordinate position.

S502: determining fourth object information of the third target object.

S503: according to a second corresponding relationship between an electronic label located at the second coordinate position and a target object, detecting whether the third target object is different from a fourth target object previously located at the second coordinate position.

S504: when the third target object is different from the fourth target object previously located at the second coordinate position, sending the fourth object information of the third target object to the first electronic label, and controlling the first electronic label to display the fourth object information of the third target object.

For example, when the electronic label content updating device is a camera, the realization process of the steps S501 to S504 is as follows.

Firstly, image collection of the electronic label is carried out through the camera, and then the position of the electronic label is detected through image recognition. If the first electronic label is detected to move from the first coordinate position to the second coordinate position, the third target object at a distance of a preset distance range of the second coordinate position is determined. Then, the third target object at a distance of a preset distance range of the second coordinate position is identified by the image. Then, according to the second corresponding relationship between the pre-stored electronic label at the second coordinate position and the target object, whether the third target object is different from the fourth target object previously at the second coordinate position is detected. When the third target object is different from the fourth target object previously located at the second coordinate position, the first electronic label is controlled to display the fourth object information of the third target object.

Specifically, the camera may send the fourth object information of the third target object to the first electronic label. The first electronic label displays the fourth object information of the third target object.

For example, the electronic label b moves from a position L2 to a position L4, and the initial target object corresponding to the position L4 is D, which is different from the target object B initially corresponding to the electronic label, then the object information corresponding to the target object D will be displayed by the electronic label b. So the content displayed by the electronic label is updated timely according to the movement of the position of the electronic label.

Figure 6:
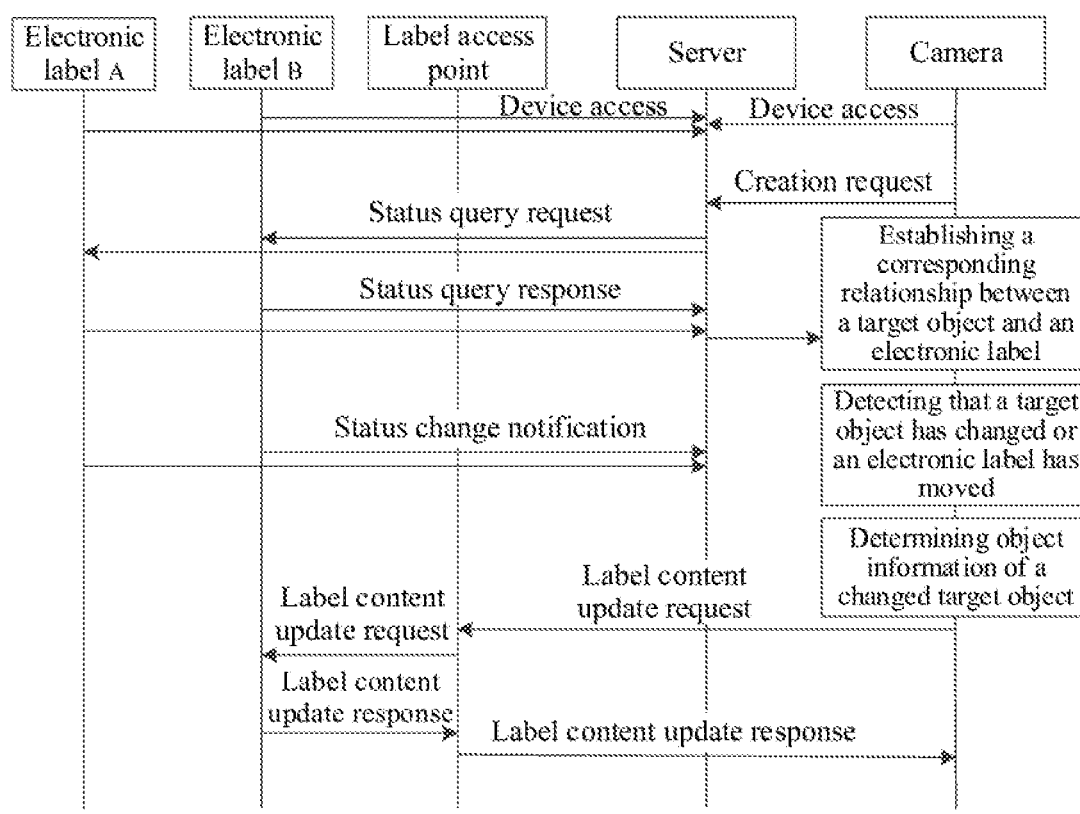
FIG. 6 is a schematic diagram of one of interactive processes in a method for updating a content of an electronic label provided by an embodiment of the present disclosure.

As shown in FIG. 6, the embodiment of the present disclosure provides an interaction process of the method for updating the content of an electronic label. For example, the electronic label content updating device is a camera; and the server connects the label access point AP. The label access point AP is responsible for an electronic label A and an electronic label B.

Specifically, the electronic label A, the electronic label B and the camera register in the server respectively (i.e., each device accesses the server). The camera sends a creation request to the server to establish a corresponding relationship between an electronic label and a target object. The server sends a status query request to the electronic label A and the electronic label B accessed by the label access point. After receiving the status query request, the electronic label A and the electronic label B send a status query response to the server, and finally, the camera establishes the corresponding relationship between a electronic label and a target object.

After the electronic label A receives the status query request, and conducts flicker feedback through the built-in infrared light-emitting diode, so that the camera can determine the coordinate position of the electronic label A according to the position of the light-emitting diode. Similarly, the electronic label B receives the status query request, and conducts flicker feedback through the built-in infrared light-emitting diode, so that the camera can determine the coordinate position of the electronic label A according to the position of the light-emitting diode.

In addition, the camera collects images of the electronic label A and the electronic label B, and identifies a corresponding target object, so as to establish the corresponding relationship between the electronic label A or the electronic label B and the corresponding target object.

When the electronic label A or the electronic label B detects the change of its coordinate position, or the camera detects the change of the position of the electronic label A or the electronic label B, or the camera detects the change of the target object at corresponding position, the electronic label A or the electronic label B will send status change notification to the camera via the server.

The camera determines corresponding target object information of the changed target object, and determines an electronic label identifier of the electronic label corresponding to the changed target object. The camera then sends a label content update request to the server or to the label access point. The server or the label access point then sends a content update request to the corresponding electronic label, such as the electronic label B. The corresponding electronic label responds to the content update request and updates initial information it displays based on the object information. The corresponding electronic label will send to the label access point or server the label content update response which is further sent back to the camera to update the corresponding relationship between the electronic label and the target object.

Figure 7:
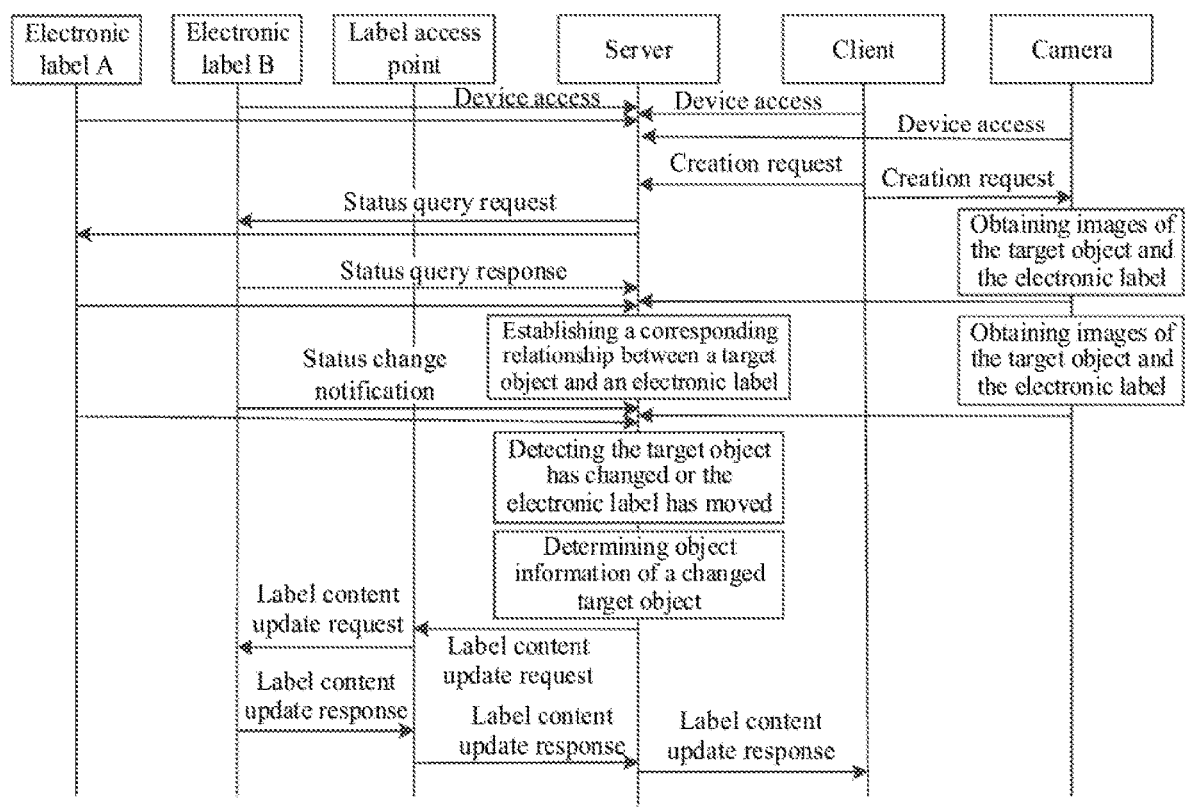
FIG. 7 is a schematic diagram of one of interactive processes in a method for updating a content of an electronic label provided by an embodiment of the present disclosure.

As shown in FIG. 7, the embodiment of the present disclosure provides an interaction process of the method for updating the content of an electronic label. The electronic label content updating device is, for example, a server; the server connects the label access point AP, and this label access point AP is responsible for the electronic label A and the electronic label B.

Specifically, the electronic label A, the electronic label B, the client and the camera register in the server respectively (i.e., each device accesses the server); the client sends a creation request to the server to establish a corresponding relationship between an electronic label and a target object. The server sends a status query request to the electronic label A and the electronic label B accessed by the label access point; after receiving the status query request, the electronic label A and the electronic label B send a status query response to the server. In addition, the client further sends a creation request to the camera to obtain the image of the target object and the electronic label through the camera, and sends it to the server. The corresponding relationship between the electronic label and the target object is established through the server.

When the electronic label A or the electronic label B detects the change of its coordinate position, or the camera detects the change of the position of the electronic label A or the electronic label B, or the camera detects the change of the target object at the corresponding position, the electronic label A or the electronic label B will send the status change notification to the server, and the camera will send the obtained image of the target object or the electronic label to the server; then, the server determines the changed target object and the corresponding electronic label according to the pre-established corresponding relationship between the electronic label and the target object, and sends the label content update request to the server or the label access point. The server or the label access point then sends a content update request to the corresponding electronic label, such as the electronic label B, which responds to the content update request and updates the initial information it displays based on the object information of the changed target object. The corresponding electronic label will send the label content update response to the label access point or server which updates the corresponding relationship between the electronic label and the target object, and the client can present the updated corresponding relationship to the user.

Figure 8:
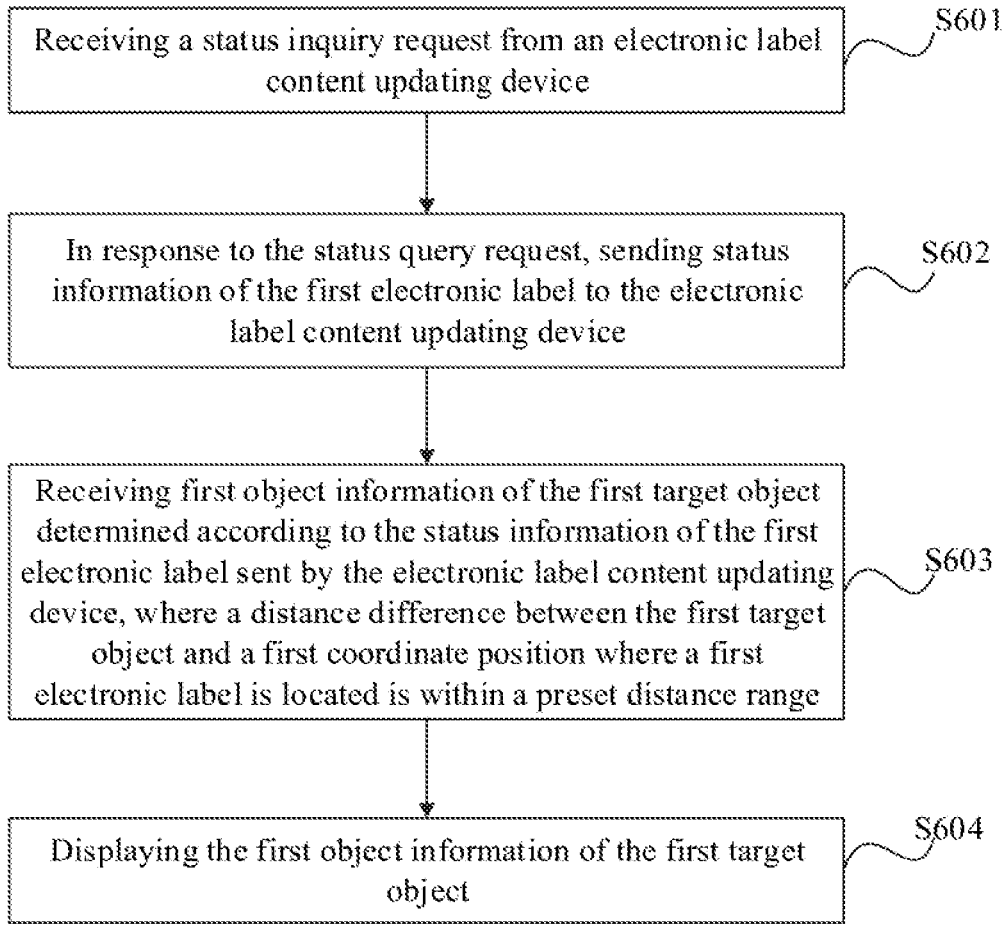
FIG. 8 is another method flow chart of a method for updating a content of an electronic label provided by an embodiment of the present disclosure.

Based on the same inventive concept, the embodiment of the present disclosure further provides, please refer to FIG. 8, a method for updating the content of electronic label, applied to a first electronic label. The method includes S601 to S604.

S601: receiving a status query request from an electronic label content updating device.

S602: in response to the status query request, sending status information of the first electronic label to the electronic label content updating device.

S603: receiving first object information of the first target object determined according to the status information of the first electronic label sent by the electronic label content updating device, wherein a distance difference between the first target object and a first coordinate position where a first electronic label is located is within a preset distance range.

S604: displaying the first object information of the first target object.

Since the specific realization process of the steps S601 to S604 has been described in detail, it will not be repeated here.

Figure 9:
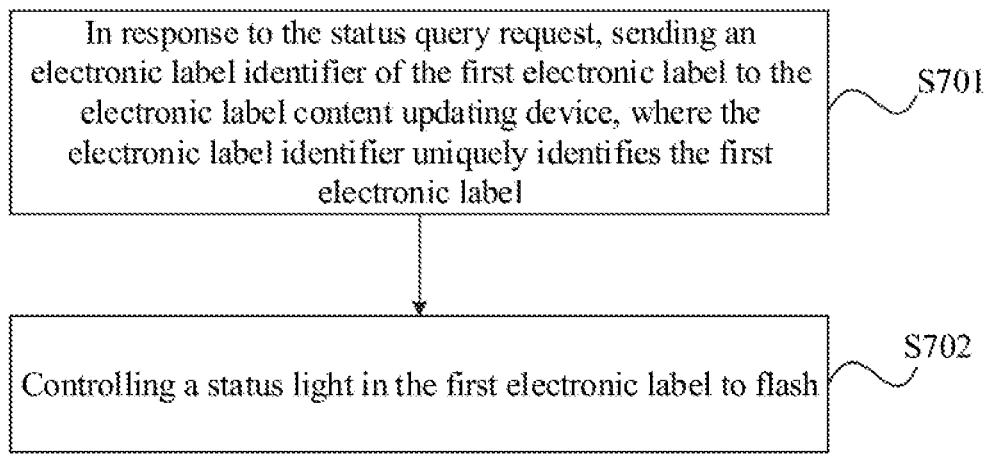
FIG. 9 is the method flow chart of step S602 in a method for updating a content of an electronic label provided by an embodiment of the present disclosure.

In the embodiment of the present disclosure, as shown in FIG. 9, the step S602, in response to the status query request, the status information of the first electronic label is sent to the electronic label content updating device includes S701-S702.

S701: in response to the status query request, sending an electronic label identifier of the first electronic label to the electronic label content updating device, wherein the electronic label identifier uniquely identifies the first electronic label.

S702: controlling a status light in the first electronic label to flash.

Figure 10:
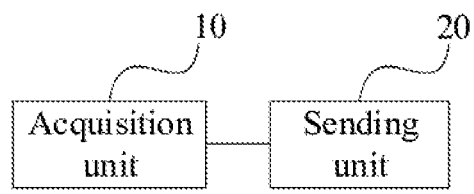
FIG. 10 is a structural schematic diagram of a device for updating a content of an electronic label provided by an embodiment of the present disclosure.

Based on the same disclosure concept, the embodiment of the present disclosure further provides, please refer to FIG. 10, an electronic label updating device includes an acquisition unit 10 and a sending unit 20.

The acquisition unit 10 is configured to obtain first object information of a first target object, where a distance difference between the first target object and a first coordinate position where a first electronic label is located is within a preset distance range.

The sending unit 20 is configured to send the first object information of the first target object to the first electronic label and control the first electronic label to display the object information of the first target object.

Figure 11:
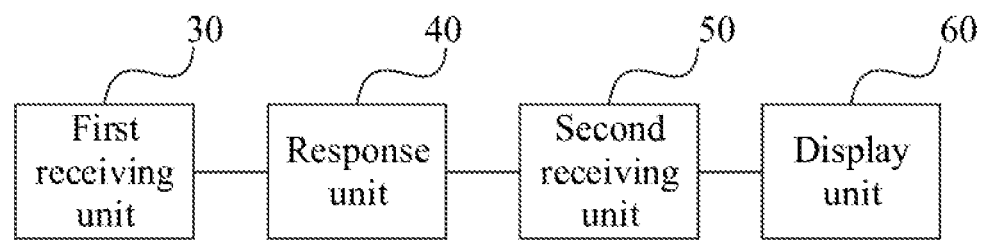
FIG. 11 is a structural schematic diagram of an electronic label provided by an embodiment of the present disclosure.

Based on the same disclosure concept, the embodiment of the present disclosure further provides, referring to FIG. 11, an electronic label, including: a first receiving unit 30, a response unit 40, a second receiving unit 50 and a display unit 60.

The first receiving unit 30 is configured to receive a status query request from an electronic label content updating device.

The response unit 40 is configured to respond to the status query request and send status information of the first electronic label to the electronic label content updating device.

The second receiving unit 50 is configured to receive first object information of the first target object determined according to the status information of the first electronic label sent by the electronic label content updating device, where a distance difference between the first target object and a first coordinate position where a first electronic label is located is within a preset distance range.

The display unit 60 is configured to display the first object information of the first target object.

Figure 12:
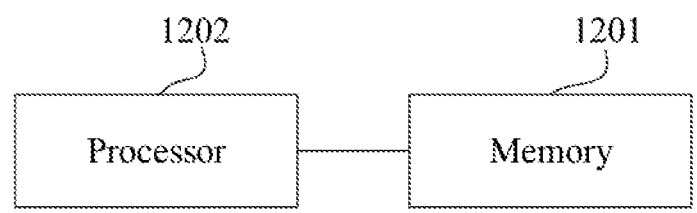
FIG. 12 is a structural schematic diagram of another device for updating a content of an electronic label provided by an embodiment of the present disclosure.

Based on the same disclosure concept, referring to FIG. 12, the embodiment of the present disclosure provides another electronic label content updating device. The device includes a memory 1201 and at least one processor 1202.

The at least one processor 1202 is configured to read and execute instructions stored in the memory 1201 to perform any method for updating a content of an electronic label according to the above embodiments of the present disclosure.

Figure 13:
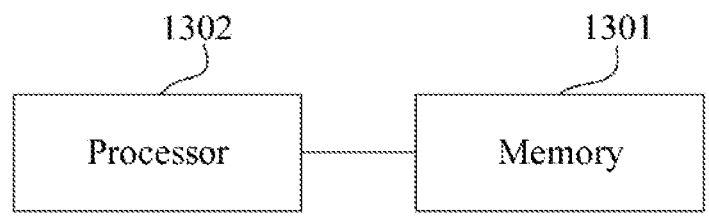
FIG. 13 is structural schematic diagram of another electronic label provided by an embodiment of the present disclosure.

Based on the same disclosure concept, referring to FIG. 13, the embodiment of the present disclosure provides another electronic label. The electronic label includes a memory 1301 and at least one processor 1302.

The at least one processor 1302 is configured to read and execute instructions stored in the memory 1301 to perform any method for updating a content of an electronic label according to the above embodiments of the present disclosure. Although the preferred embodiments of the present disclosure have been described, additional changes and modifications may be made to these embodiments once the basic inventive concepts are known to those skilled in the art. Therefore, the attached claims are intended to be interpreted to include the preferred embodiments and all changes and modifications falling within the scope of the present disclosure.

Obviously, those skilled in the art can make various changes and variations to the present application without deviating from the spirit and scope of the present application. Thus, if the modifications and variations in the present application fall within the scope of the claims of the present application and its equivalent technologies, the present application further intends to include them.

The invention claimed is:

1. A method for updating a content of an electronic label, applied to an electronic label content updating device, the method comprising:
obtaining first object information of a first target object, wherein a distance difference between the first target object and a first coordinate position where a first electronic label is located is within a preset distance range; and
sending the first object information of the first target object to the first electronic label and controlling the first electronic label to display the first object information of the first target object;
wherein the method further comprises:
determining the first coordinate position of the first electronic label and a first electronic label identifier of the first electronic label, wherein the first electronic label identifier uniquely identifies the first electronic label;
determining that there is the first target object whose distance difference from the first coordinate position is within the preset distance range;
determining the first object information of the first target object; and
establishing a first corresponding relationship between the first electronic label located at the first coordinate position and the first target object;
wherein the determining the first coordinate position of the first electronic label comprises:
obtaining an image of the first electronic label, wherein the image comprises a mark point configured to represent a coordinate position of the first electronic label; and
determining the first coordinate position of the first electronic label according to the coordinate position represented by the mark point.

2. The method according to claim 1, wherein after the establishing the first corresponding relationship between the first electronic label and the first target object, the method further comprises:
according to the first corresponding relationship, detecting whether the first target object has changed;
when the first target object has changed, determining second object information of a changed target object; and
sending the second object information of the changed target object to the first electronic label, and controlling the first electronic label to display the second object information of the changed target object.

3. The method according to claim 2, wherein the detecting whether the first target object has changed according to the first corresponding relationship comprises:
determining third object information of a second target object, wherein a distance difference between the second target object and the first coordinate position is within the preset distance range; and detecting whether the third object information of the second target object is the same as the first object information of the first target object in the first corresponding relationship;

when the third object information of the second target object is different from the first object information of the first target object in the first corresponding relationship, determining that the first target object has changed.

4. The method according to claim 1, wherein after controlling the first electronic label to display the first object information of the first target object, the method further comprises:

when the first electronic label moves from the first coordinate position to a second coordinate position, determining a third target object, wherein a distance difference between the third target object and the second coordinate position is within the preset distance range;

determining fourth object information of the third target object;

according to a second corresponding relationship between an electronic label located at the second coordinate position and a target object, detecting whether the third target object is different from a fourth target object previously located at the second coordinate position; and when the third target object is different from the fourth target object previously located at the second coordinate position, sending the fourth object information of the third target object to the first electronic label, and controlling the first electronic label to display the fourth object information of the third target object.

5. The method according to claim 1, wherein the first object information comprises at least one of an identifier, price, or name.

6. A method for updating a content of an electronic label, applied to a first electronic label, the method comprising:

receiving a status query request from an electronic label content updating device;

in response to the status query request, sending status information of the first electronic label to the electronic label content updating device;

receiving first object information of the first target object determined according to the status information of the first electronic label sent by the electronic label content updating device, wherein a distance difference between the first target object and a first coordinate position where a first electronic label is located is within a preset distance range; and displaying the first object information of the first target object;

wherein, in response to the status query request, sending the status information of the first electronic label to the electronic label content updating device comprises:

in response to the status query request, sending an electronic label identifier of the first electronic label to the electronic label content updating device, wherein the electronic label identifier uniquely identifies the first electronic label; and controlling a status light in the first electronic label to flash.

7. An electronic label content updating device, comprising: a memory and at least one processor, wherein the at least one processor is configured to read and execute instructions stored in the memory to perform:

obtaining first object information of a first target object, wherein a distance difference between the first target object and a first coordinate position where a first electronic label is located is within a preset distance range; and sending the first object information of the first target object to the first electronic label, and controlling the first electronic label to display the first object information of the first target object;

wherein the at least one processor is further configured to read and execute instructions stored in the memory to perform:

determining the first coordinate position of the first electronic label and a first electronic label identifier of the first electronic label, wherein the first electronic label identifier uniquely identifies the first electronic label;

determining that there is the first target object whose distance difference from the first coordinate position is within the preset distance range;

determining the first object information of the first target object; and establishing a first corresponding relationship between the first electronic label located at the first coordinate position and the first target object;

wherein the at least one processor is further configured to read and execute instructions stored in the memory to perform:

obtaining an image of the first electronic label, wherein the image comprises a mark point configured to represent a coordinate position of the first electronic label; and determining the first coordinate position of the first electronic label according to the coordinate position represented by the mark point.

8. The electronic label content updating device according to claim 7, wherein the at least one processor is further configured to read and execute instructions stored in the memory to perform:

according to the first corresponding relationship, detecting whether the first target object has changed;

when the first target object has changed, determining second object information of a changed target object; and sending the second object information of the changed target object to the first electronic label, and controlling the first electronic label to display the second object information of the changed target object.

9. The electronic label content updating device according to claim 8, wherein the at least one processor is further configured to read and execute instructions stored in the memory to perform:

determining third object information of a second target object, wherein a distance difference between the second target object and the first coordinate position is within the preset distance range;

detecting whether the third object information of the second target object is the same as the first object information of the first target object in the first corresponding relationship; and when the third object information of the second target object is different from the first object information of the first target object in the first corresponding relationship, determining that the first target object has changed.

10. The electronic label content updating device according to claim 7, wherein the at least one processor is further configured to read and execute instructions stored in the memory to perform:

when the first electronic label moves from the first coordinate position to a second coordinate position, determining a third target object, wherein a distance difference between the third target object and the second coordinate position is within the preset distance range;

determining fourth object information of the third target object;

according to a second corresponding relationship between an electronic label located at the second coordinate position and a target object, detecting whether the third target object is different from a fourth target object previously located at the second coordinate position; and when the third target object is different from the fourth target object previously located at the second coordinate position, sending the fourth object information of the third target object to the first electronic label, and controlling the first electronic label to display the fourth object information of the third target object.

11. The electronic label content updating device according to claim 7, wherein the first object information comprises at least one of an identifier, price, or name.

12. An electronic label, comprising: a memory and at least one processor, wherein the at least one processor is configured to read and execute instructions stored in the memory to perform the method of claim 6.

\* \* \* \* \*